United States Patent
Tsai et al.

(10) Patent No.: US 8,266,374 B2
(45) Date of Patent: Sep. 11, 2012

(54) METHOD OF IDENTIFYING PHYSICAL CHARACTERISTIC INFORMATION OF OPTICAL DISC AND RELATED CONTROLLER THEREOF

(75) Inventors: Ping-Tsai Tsai, Kaohsiung (TW); Ya-Fang Nien, Hsin-Chu (TW); Kun-Yi Chan, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 382 days.

(21) Appl. No.: 12/562,140

(22) Filed: Sep. 18, 2009

(65) Prior Publication Data
US 2011/0069593 A1    Mar. 24, 2011

(51) Int. Cl.
*G06F 12/00* (2006.01)
(52) U.S. Cl. ............. 711/112; 711/4; 711/100; 711/111
(58) Field of Classification Search ............... 711/4, 100, 711/111–112; 369/47.1
See application file for complete search history.

(56) References Cited

U.S. PATENT DOCUMENTS

2004/0174793 A1* 9/2004 Park et al. ............... 369/59.25
2007/0115793 A1* 5/2007 Mizuno ................... 369/124.11

FOREIGN PATENT DOCUMENTS

| CN | 1592927 A | 3/2005 |
|---|---|---|
| JP | 2008140495 A | 6/2008 |
| WO | WO 2004017311 A1 | 2/2004 |

* cited by examiner

*Primary Examiner* — Jasmine Song
(74) *Attorney, Agent, or Firm* — Winston Hsu; Scott Margo

(57) ABSTRACT

A method of identifying physical characteristic information of an optical disc includes: deriving a reading result by reading at least a first region of the optical disc, where a location of the first region is specified in a Blu-ray disc specification for recording information associated with recording management of a BD recordable disc; and identifying a first physical characteristic of the optical disc according to the reading result.

6 Claims, 6 Drawing Sheets

METHOD OF IDENTIFYING PHYSICAL CHARACTERISTIC INFORMATION OF OPTICAL DISC AND RELATED CONTROLLER THEREOF

BACKGROUND

The disclosed embodiments relate to identifying physical characteristic information of an optical disc, and more particularly, to a method and related controller for identifying physical characteristic information of an optical disc, such as a disc type, layer number and/or disc capacity of a Blu-ray disc (BD), by referring to a reading result derived from reading specific region(s) on the optical disc, where each specific region is specified in the BD specification for recording information associated with recording management of a BD recordable disc.

Optical storage media, such as recordable optical discs, have become popular data carriers nowadays. When an optical disc is loaded into an optical disc drive, the optical disc drive has to acquire physical characteristic information of the optical disc for reading data from or recording data onto the optical disc. Taking a Blu-ray disc (BD) for example, the physical characteristic information is generally derived from a permanent information & control data (PIC) zone or ADIP (Address In Pre-Groove) Aux frames on the BD disc. However, when the BD disc has defective areas due to scratch, dirt, or fingerprint on a surface of the BD disc, the optical disc drive might have difficulty in reading the physical characteristic information from the PIC zone or ADIP Aux frame which is fully or partially affected thereby. Besides, even though the optical disc drive may successfully read the physical characteristic information from the PIC zone or ADIP Aux frame, the overall reading procedure is time-consuming.

In view of above, avoiding deriving the physical characteristic information from the PIC zone or ADIP Aux frame is beneficial to the performance of the optical disc drive. Therefore, there is a need for obtaining the desired physical characteristic information of the optical disc without reading the PIC zone or ADIP Aux frame.

SUMMARY

In accordance with exemplary embodiments of the present invention, a method and related controller of identifying physical characteristic information of an optical disc are proposed.

In accordance with one aspect of the present invention, an exemplary method of identifying physical characteristic information of an optical disc is disclosed. The exemplary method includes following steps: deriving a reading result by reading at least a first region of the optical disc, where a location of the first region is specified in a Blu-ray disc (BD) specification for recording information associated with recording management of a BD recordable disc; and identifying a first physical characteristic of the optical disc according to the reading result.

In accordance with another aspect of the present invention, an exemplary controller capable of identifying physical characteristic information of an optical disc is disclosed. The exemplary controller includes a control unit and an identifying unit. The control unit is implemented for controlling a data accessing block of an optical disc drive to derive a reading result by reading at least a first region of the optical disc, where a location of the first region is specified in a Blu-ray disc (BD) specification for recording information associated with recording management of a BD recordable disc. The identifying unit is implemented for identifying a first physical characteristic of the optical disc according to the reading result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

To put it simply, exemplary embodiments of the present invention propose identifying physical characteristic information of an optical disc by reading specific region(s) of the optical disc according to a Blu-ray disc (BD) specification, where each specific region is specified in the BD specification for recording information associated with recording management of a BD recordable disc. That is, the information recorded in the specific region is utilized to define and control the way of recording the BD recordable disc. By way of example, not limitation, a location of the specific region of the optical disc corresponds to a disc management area (DMA) or a temporary disc management area (TDMA) specified in the BD specification. In this way, as the time-consuming data reading operation performed upon the PIC zone or ADIP Aux frame is avoided, the physical characteristic information of an optical disc (e.g., a BD recordable disc) can be quickly obtained, leading to improved performance of the optical disc drive.

Figure 1:
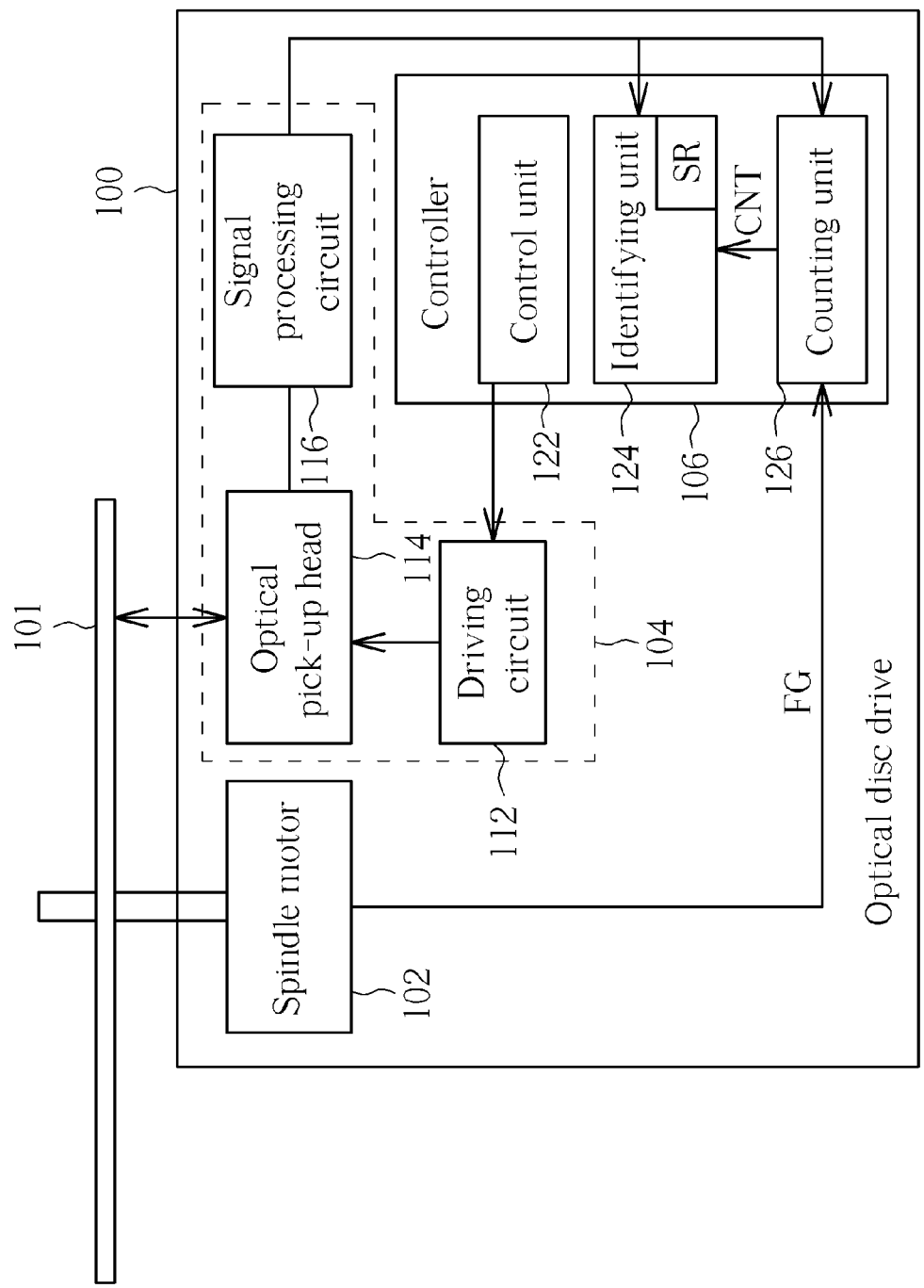
FIG. 1 is a diagram illustrating an optical storage apparatus according to an exemplary embodiment of the present invention.

FIG. 1 is a diagram illustrating an optical storage apparatus according to an exemplary embodiment of the present invention. The exemplary optical storage apparatus is an optical disc drive 100 which includes, but is not limited to, a spindle motor 102, a data accessing block 104, and a controller 106. The spindle motor 102 is implemented to rotate an optical disc 101 at a rotational speed; besides, a frequency generator (FG) signal generated in response to a spindle rotation has a predetermined number of FG pulses per one full rotation of the optical disc 101. The data accessing block 104 includes a driving circuit 112, an optical pick-up head 114, and a signal processing circuit 116. The optical pick-up head 114 is operative to emit a laser beam with specific read power onto the optical disc 101 to read data from the optical disc 101. If the optical disc 101 is a recordable disc, the optical pick-up head 114 can be configured to emit a laser beam with specific write power to record data onto the optical disc 101. The operation of the optical pick-up head 114 is controlled by the driving circuit 112. For example, the driving circuit 112 includes servo & power control circuitry implemented to control the tracking, focusing, and laser power of the optical pick-up head 114. As details of the servo control mechanism and the power control mechanism applied to the optical pick-up head 114 are well known to those skilled in the art, further description is omitted here for the sake of brevity. The signal processing circuit 116 is implemented for generating a readback signal, such as a radio frequency (RF) signal, according to signals reflected from the optical disc 101 and then detected by a photo sensor (not shown) in the optical pick-up head 114. In other words, data recorded on the optical disc 101 would be reproduced at an output of the signal processing circuit 116.

The controller 106 is capable of identifying physical characteristic information of the optical disc 101, and includes a control unit 122, an identifying unit 124, and a counting unit 126. The control unit 122 is implemented for controlling the data accessing block 104 to derive a reading result SR by reading one or more regions of the optical disc 101 according to a Blu-ray disc (BD) specification, where each region is specified in the BD specification for recording information associated with recording management of a BD recordable disc. The counting unit 126 is implemented for counting data units (e.g., data frames) in one full rotation of the optical disc 101 to generate a count number CNT. By way of example, not limitation, the counting unit 126 refers to FG pulses generated in response to a spindle rotation to know when the optical disc 101 has one full rotation, and refers to the output of the signal processing circuit 116 to count data frames received during one full rotation of the optical disc 101. That is, the count number CNT in such an exemplary implementation is indicative of data units (e.g., data frames) included in one full circular track of the optical disc 101 corresponding to a track position where the optical pick-up head 114 is located. The identifying unit 124 is designed for identifying physical characteristics of the optical disc 101 according to the reading result SR and/or the count number CNT. In this exemplary embodiment, the reading result SR is used for identifying a disc type of the optical disc 101, and the count number CNT is used for identifying a capacity of the optical disc 101. However, this is for illustrative purposes only, and is not meant to be a limitation of the present invention. The operation and function of the controller 106 are detailed as follows.

Figure 2:
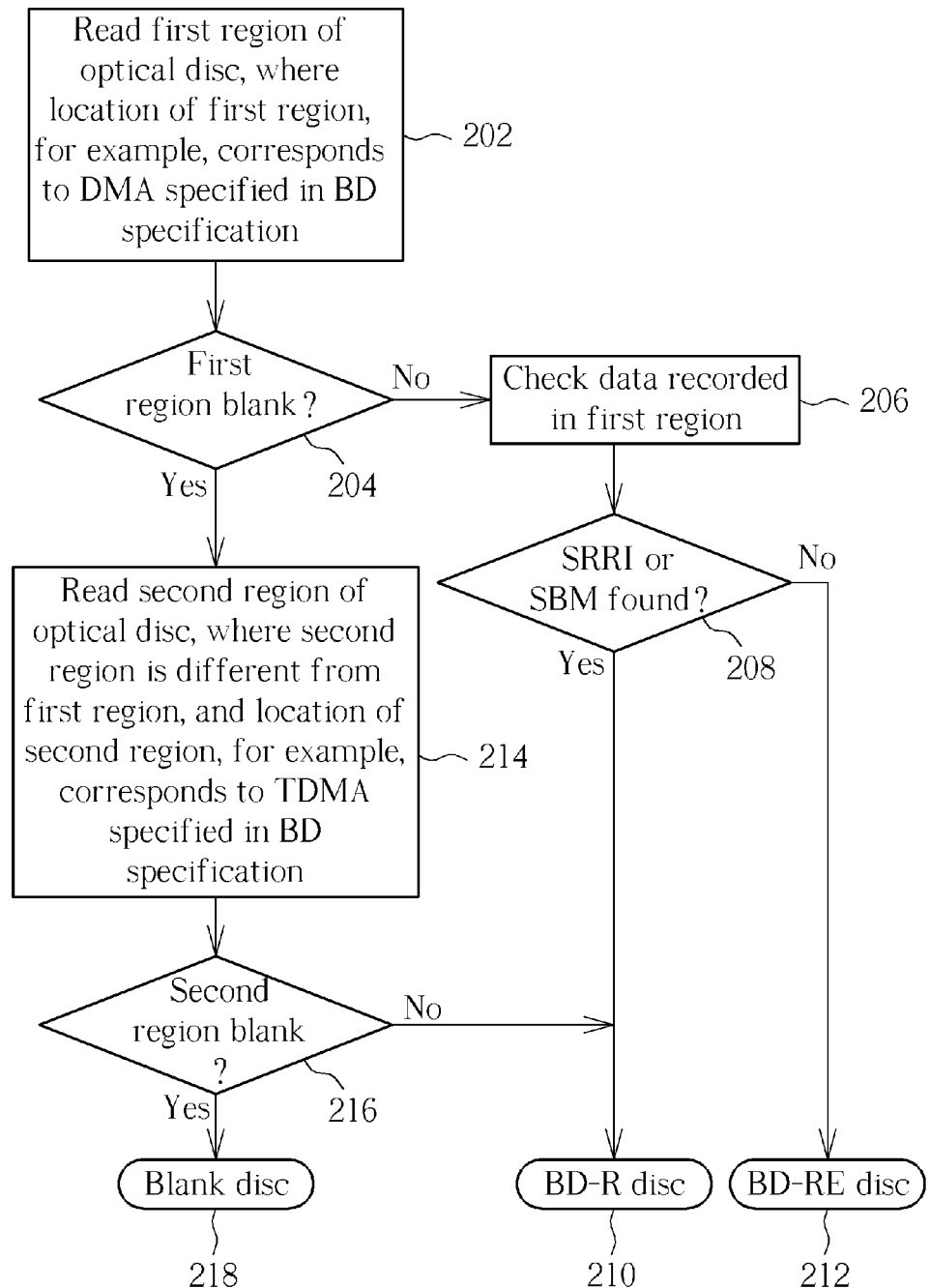
FIG. 2 is a flowchart illustrating a first exemplary embodiment of a method of identifying physical characteristic information of an optical disc according to the present invention.

Please refer to FIG. 2 in conjunction with FIG. 1. FIG. 2 is a flowchart illustrating a first exemplary embodiment of a method of identifying physical characteristic information of an optical disc according to the present invention. Provided that the result is substantially the same, the steps are not required to be performed in the exact order shown in FIG. 2. In this exemplary embodiment, the method is employed by the optical disc drive 100 shown in FIG. 1 for identifying a disc type of the optical disc 101, and includes following steps:

Step 202: Read a first region of the optical disc according to a Blu-ray disc (BD) specification. For example, a location of the first region corresponds to a disc management area (DMA) specified in the BD specification.

Step 204: Check if the first region is blank. If yes, go to step 214; otherwise, go to step 206.

Step 206: Check data recorded in the first region.

Step 208: Does the data recorded in the first region include sequential recording range information (SRRI) or a space bit map (SBM)? If yes, go to step 210; otherwise, go to step 212.

Step 210: Identify the optical disc as a BD-R disc.

Step 212: Identify the optical disc as a BD-RE disc.

Step 214: Read a second region of the optical disc according to the BD specification. For example, the second region is different from the first region, and a location of the second region corresponds to a temporary disc management area (TDMA) specified in the BD specification.

Step 216: Check if the second region is blank. If yes, go to step 218; otherwise, go to step 210.

Step 218: Identify the optical disc as a blank disc, such as a blank BD disc.

After the optical disc 101 is loaded into the optical disc drive 100 and then rotated by the spindle motor 102 at a rotational speed, the control unit 122 is operative to instruct the driving circuit 112 to control the optical pick-up head 114 to move to a first region of the optical disc 101 according to a Blu-ray disc (BD) specification and then read the first region (Step 202), where the first region is specified in the BD specification for recording information associated with recording management of a BD recordable disc. In one exemplary embodiment, a location of the first region corresponds to a disc management area (DMA) specified in the BD specification. In other words, when the optical pick-up head 114 is reading the first region of the optical disc 101, the identifying unit 124 checks an output of the signal processing circuit 116 to obtain a reading result SR including a result of attempting to read DMA data from the optical disc 101. When the reading result SR indicates that the first region is not blank, implying that the optical disc 101 does have DMA data recorded thereon, the identifying unit 124 checks the DMA data recorded in the first region to determine whether the optical disc 101 is a BD-R disc or a BD-RE disc (Steps 204 and 206).

Figure 3:
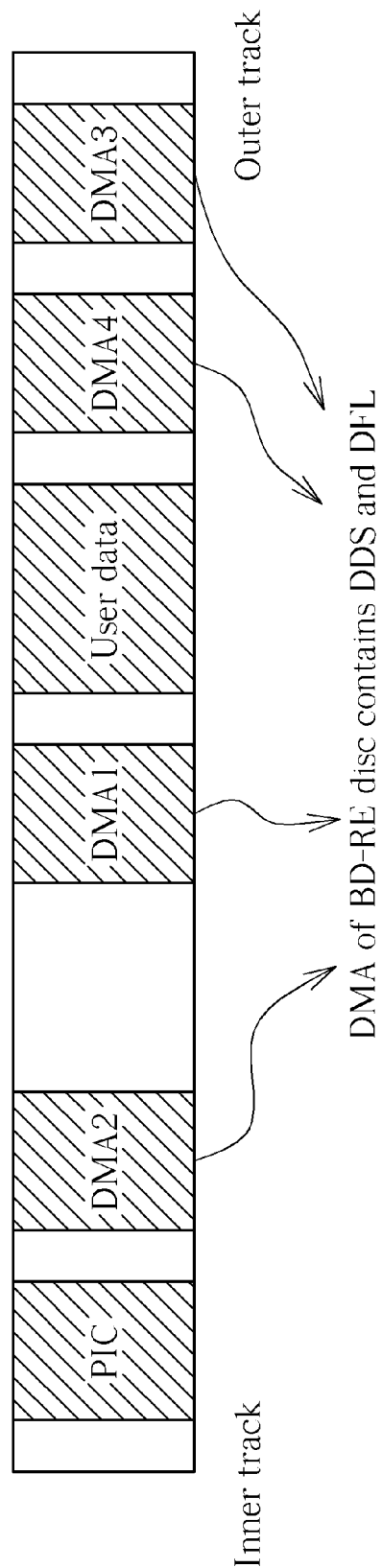
FIG. 3 is a diagram illustrating an exemplary BD-RE disc layout.
Figure 4:
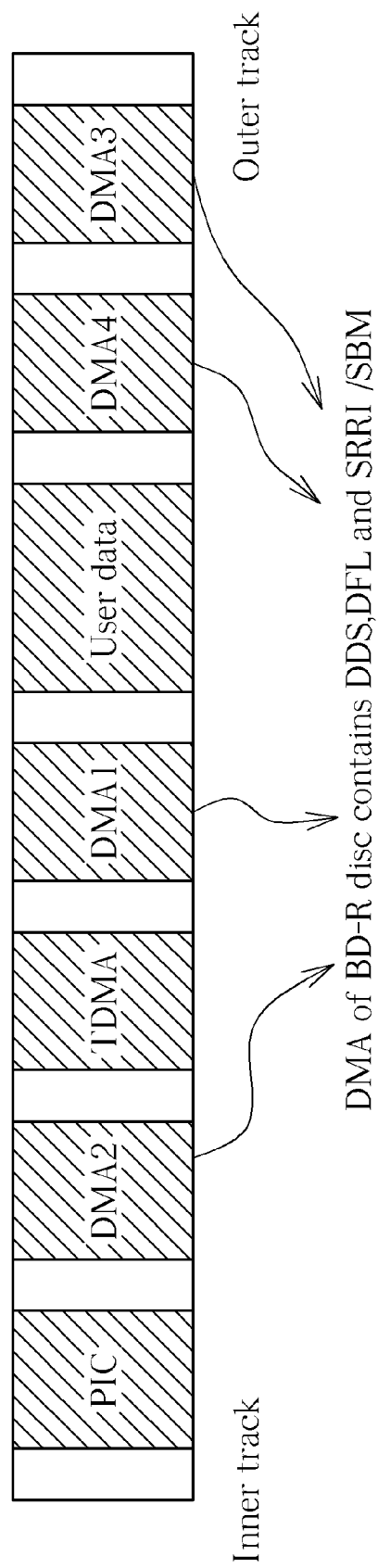
FIG. 4 is a diagram illustrating an exemplary BD-R disc layout.

Please refer to FIG. 3 in conjunction with FIG. 4. FIG. 3 is a diagram illustrating an exemplary BD-RE disc layout, and FIG. 4 is a diagram illustrating an exemplary BD-R disc layout. As known to those skilled in the art, both of the BD-R disc and BD-RE disc are BD recordable discs; however, the BD-R disc can be written just once, whereas the BD-RE disc can be erased and rewritten multiple times. In accordance with the BD specification, the DMA area included in the BD-RE disc may contain a disc definition structure (DDS) and a defect list (DFL); however, in addition to the DDS and DFL, the DMA area included in the BD-R disc may contain a sequential recording range information (SRRI) or a space bit map (SBM). Based on above-mentioned difference between the DMA contents stored on the BD-R disc and BD-RE disc, the identifying unit 124 can easily identify the optical disc 101 as a BD-R disc or a BD-RE disc by checking information included in the data read from the first region (i.e., the DMA area) of the optical disc 101. For example, in a case where the data recorded in the first region include SRRI or SBM, the identifying unit 124 identifies the optical disc 101 as the BD-R disc (Step 210), and in another case where the data recorded in the first region include none of SRRI and SBM, the identifying unit 124 identifies the optical disc 101 as the BD-RE disc (Step 212).

When step 204 finds that the first region is blank, the flow proceeds with step 214. The control unit 122 is operative to instruct the driving circuit 112 to control the optical pick-up head 114 to move to a second region of the optical disc 101 according to the BD specification and then read the second region (Step 214), where the second region is different from the first region, and the second region is specified in the BD specification for recording information associated with recording management of a BD recordable disc. For example, a location of the second region corresponds to a temporary disc management area (TDMA) specified in the BD specification. In other words, when the optical pick-up head 114 is reading the second region of the optical disc 101, the identifying unit 124 checks an output of the signal processing circuit 116 to obtain the reading result SR including a result of attempting to read TDMA data from the optical disc 101. As can be seen from FIG. 3 and FIG. 4, the TDMA area is unique to the BD-R disc. Therefore, when the reading result SR indicates that the second region is not blank, implying that the optical disc 101 does have TDMA data recorded thereon, the identifying unit 124 identifies the optical disc 101 as a BD-R disc (Steps 216 and 210). However, when the reading result SR indicates that the second region is blank, the identifying unit 124 identifies the optical disc 101 as a blank disc (Steps 216 and 218).

Figure 5:
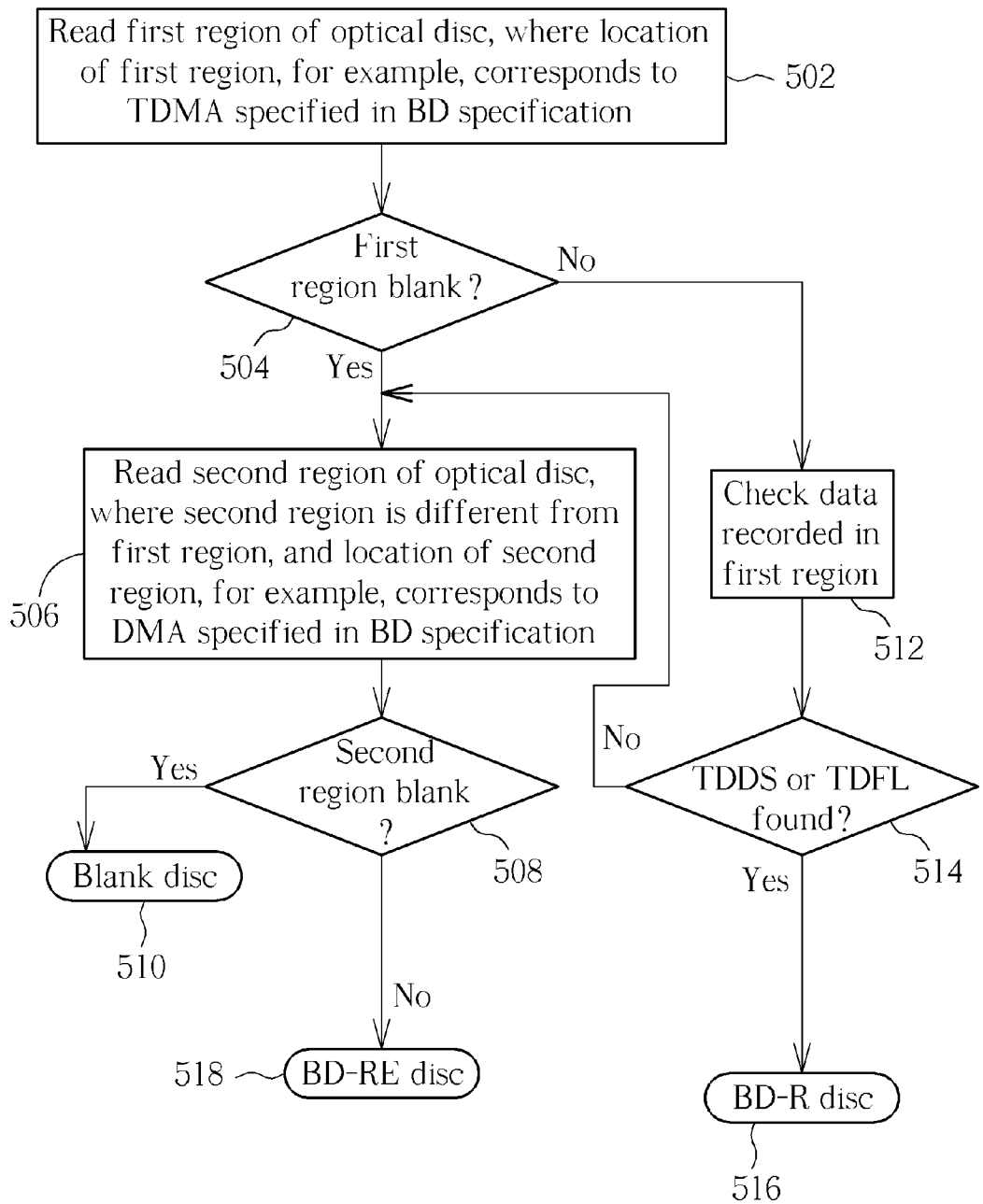
FIG. 5 is a flowchart illustrating a second exemplary embodiment of a method of identifying physical characteristic information of an optical disc according to the present invention.

In above exemplary flow shown in FIG. 2, reading one region with an address corresponding to a DMA area is performed first to see if the reading result can be used to successfully identify the disc type of the optical disc 101, and reading another region with an address corresponding to the TDMA area will be performed when the disc type of the optical disc 101 cannot be successfully confirmed by the reading result of the region with the address corresponding to the DMA area. However, in an alternative design, reading a region with an address corresponding to a TDMA area can be performed first to see if the reading result can be used to successfully identify the disc type of the optical disc 101, and reading another region with an address corresponding to a DMA area will be performed when the disc type of the optical disc 101 cannot be successfully confirmed by the reading result of the region with the address corresponding to the TDMA area. The same objective of identifying a disc type of the optical disc 101 loaded into the optical disc drive 100 is achieved. FIG. 5 is a flowchart illustrating a second exemplary embodiment of a method of identifying physical characteristic information of an optical disc according to the present invention. Provided that the result is substantially the same, the steps are not required to be performed in the exact order shown in FIG. 5. In this exemplary embodiment, the method is employed by the optical disc drive 100 shown in FIG. 1 for identifying a disc type of the optical disc 101, and includes following steps:

Step 502: Read a first region of the optical disc according to a Blu-ray disc (BD) specification. For example, a location of the first region corresponds to a temporary disc management area (TDMA) specified in the BD specification.

Step 504: Check if the first region is blank. If yes, go to step 506; otherwise, go to step 512.

Step 506: Read a second region of the optical disc according to the BD specification. For example, the second region is different from the first region, and a location of the second region corresponds to a disc management area (DMA) specified in the BD specification.

Step 508: Check if the second region is blank. If yes, go to step 510; otherwise, go to step 518.

Step 510: Identify the optical disc as a blank disc, such as a blank BD disc.

Step 512: Check data recorded in the first region.

Step 514: Does the data recorded in the first region include TDMA information, such as a temporary disc definition structure (TDDS) or a temporary defect list (TDFL)? If yes, go to step 516; otherwise, go to step 506.

Step 516: Identify the optical disc as a BD-R disc.

Step 518: Identify the optical disc as a BD-RE disc.

In a case where the reading result SR derived from reading a first region of the optical disc indicates that the first region is not blank (Step 504), the checked first region may have valid TDMA data or non-TDMA data recorded thereon. For example, if the optical disc is a BD-R disc, the first region of the BD-R disc actually has valid TDMA data recorded thereon; however, if the optical disc is a BD-RE disc, the first region of the BD-RE disc may be filled with 0's which are not TDMA data. Therefore, the exemplary flow will proceed with step 514 to check if the data recorded in the first region include TDMA information (e.g., TDDS or TDFL). If the first region does have valid TDMA data recorded thereon, the identifying unit 124 identifies the optical disc 101 as a BD-R disc (Step 516); otherwise, the exemplary flow goes to step 506 to read a second region of the optical disc according to the BD specification. When the reading result SR derived from reading the second region of the optical disc indicates that the second region is not blank, the identifying unit 124 identifies the optical disc 101 as a BD-RE disc (Steps 508 and 518). Otherwise, the identifying unit 124 identifies the optical disc 101 as a blank disc (Steps 508 and 510).

Regarding a BD read-only system, such as a BD disc player, performing a reading operation upon the DMA area to acquire information included therein is necessary. Therefore, the exemplary embodiments of the present invention propose using information of the DMA area to identify physical characteristic information of a BD disc without reading the PIC zone or ADIP Aux frame. In this way, the time required for reading the PIC zone or ADIP Aux frame is saved; besides, the problem resulted from a reading failure of the PIC zone or ADIP Aux frame is avoided. Briefly summarized, the present invention can effectively shorten the time required for identifying the disc type of an optical disc (e.g., a BD recordable disc) loaded into an optical disc drive (e.g., a BD disc player).

Please note that if the optical disc 101 is not a blank BD recordable disc, data read from the DMA/TDMA area on the optical disc 101 may provide information required for identifying the layer number, the disc capacity, etc.

As mentioned above, the physical characteristic information of the optical disc 101 can be identified by referring to signatures presented in the original information of the DMA/TDMA area on the optical disc 101. In an alternative design, the information recorded in the PIC zone, such as BD layer type identifier, disc size, etc, is copied and then written into the unused space of the DMA area when the optical disc drive 100 records information associated with recording management into the DMA area. For example, when recording user data onto the optical disc (e.g., a BD recordable disc) 101, the optical disc drive 100 also reads information of the PIC zone, and records the information of the PIC zone into reserved space, such as reserved bytes starting from $96^{th}$ byte of the disc definition structure (DDS) in the DMA area. When the optical disc 101 is loaded into the optical disc drive 100 again, the information of the PIC zone can be quickly and simply obtained by reading the DMA area which stores a copy of the information of the PIC zone. It should be noted that storing a copy of the information of the PIC zone in the DMA area is for illustrative purposes only. That is, recording a copy of the information of the PIC zone into any free and accessible area on the optical disc 101 still obeys the spirit of the present invention.

Figure 6:
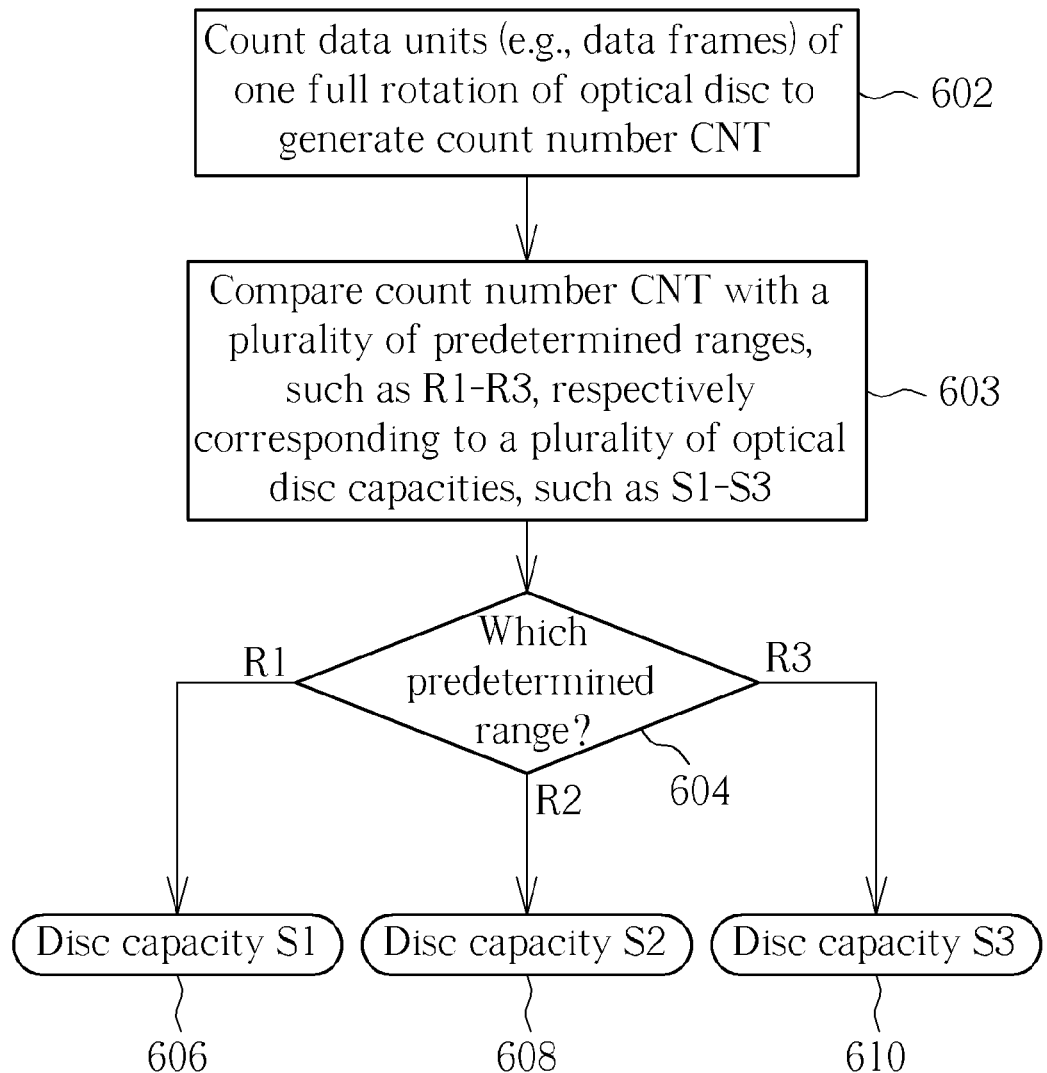
FIG. 6 is a flowchart illustrating a third exemplary embodiment of a method of identifying physical characteristic information of an optical disc according to the present invention.

As mentioned above, the controller 106 also includes the counting unit 126 implemented for obtaining the count number CNT which can be used to identify another physical characteristic of the optical disc 101. Please refer to FIG. 6 in conjunction with FIG. 1. FIG. 6 is a flowchart illustrating a third exemplary embodiment of a method of identifying physical characteristic information of an optical disc according to the present invention. Provided that the result is substantially the same, the steps are not required to be performed in the exact order shown in FIG. 6. In this exemplary embodiment, the method is employed by the optical disc drive 100 shown in FIG. 1 for identifying a capacity of the optical disc 101, and includes following steps:

Step 602: Count data units (e.g., data frames) in one full rotation of an optical disc to generate a count number CNT.

Step 603: Compare the count number CNT with a plurality of predetermined ranges respectively corresponding to a plurality of optical disc capacities. For example, the count number CNT is compared with a first predetermined range R1, a second predetermined range R2, and a third predetermined range R3 corresponding to a first optical disc capacity 51 (e.g., 23 gigabytes), a second optical disc capacity S2 (e.g., 25 gigabytes), and a third optical disc capacity S3 (e.g., 27 gigabytes), respectively.

Step 604: Refer to the comparison result to determine which predetermined range that the count number CNT falls within. If the count number CNT falls within the first predetermined range R1, go to step 606. If the count number CNT falls within the second predetermined range R2, go to step 608. If the count number CNT falls within the third predetermined range R3, go to step 610.

Step 606: Identify the capacity of the optical disc as the first optical disc capacity S1.

Step 608: Identify the capacity of the optical disc as the second optical disc capacity S2.

Step 610: Identify the capacity of the optical disc as the third optical disc capacity S3.

The counting unit 126 counts data units (e.g., data frames) in one full rotation of the optical disc 101 to generate a count number CNT. For example, the counting unit 126 refers to FG pulses generated in response to a spindle rotation to know when the optical disc 101 has one full rotation, and refers to the output of the signal processing circuit 116 to count data units (e.g., data frames) received during one full rotation of the optical disc 101. Next, the identifying unit 124 compares the count number CNT with a plurality of predetermined ranges respectively corresponding to a plurality of optical disc capacities, and identifies the capacity of the optical disc 101 as a specific optical disc capacity corresponding to a specific range when the count number CNT falls within the specific range of the predetermined ranges. Provided that the count number CNT is calculated under a condition where the optical pick-up head 114 is located at a specific track position on the optical disc 101, each of the predetermined ranges can be set by referring to a total number of data units (e.g., data frames) included in one full circular track located at the specific track position on an optical disc with a particular disc capacity. For example, based on the disc specification, a 23 GB BD disc should have N1 data frames included in one full circular track located at the specific track position, a 25 GB BD disc should have N2 data frames included in one full circular track located at the specific track position, and a 27 GB BD disc should have N3 data frames included in one full circular track located at the specific track position, where N1<N2<N3. The first predetermined range R1 can be simply set by an upper bound N1*(1+3%) and a lower bound N1*(1−3%), the second predetermined range R2 can be simply set by an upper bound N2*(1+3%) and a lower bound N2*(1−3%), and the third predetermined range R3 can be simply set by an upper bound N3*(1+3%) and a lower bound N3*(1−3%). It should be noted that the total number of predetermined ranges used for identifying the disc capacity and above settings of the predetermined ranges are for illustrative purposes only, and are not meant to be limitations to the scope of the present invention.

Those skilled in the art will readily observe that numerous modifications and alterations of the device and method may be made while retaining the teachings of the invention.

What is claimed is:

1. A method of identifying physical characteristic information of an optical disc, comprising:
    deriving a reading result by reading at least a first region of the optical disc, wherein a location of the first region is specified in a Blu-ray disc (BD) specification for recording information associated with recording management of a BD recordable disc; and
    identifying a first physical characteristic of the optical disc according to the reading result;
wherein the location of the first region corresponds to a disc management area (DMA) specified in the BD specification; the first physical characteristic of the optical disc is a disc type of the optical disc; and identifying the first physical characteristic of the optical disc according to the reading result comprises:
    when the reading result indicates that the first region is not blank, checking data recorded in the first region, identifying the optical disc as a BD-R disc when the data recorded in the first region include sequential recording range information (SRRI) or a space bit map (SBM), and identifying the optical disc as a BD-RE disc when the data recorded in the first region include none of the SRRI and the SBM.

2. A method of identifying physical characteristic information of an optical disc, comprising:
    deriving a reading result by reading at least a first region of the optical disc, wherein a location of the first region is specified in a Blu-ray disc (BD) specification for recording information associated with recording management of a BD recordable disc;
    identifying a first physical characteristic of the optical disc according to the reading result;
    counting data units in one full rotation of the optical disc to generate a count number; and
    identifying a second physical characteristic of the optical disc according to the count number.

3. The method of claim 2, wherein the second physical characteristic of the optical disc is a capacity of the optical disc, and identifying the second physical characteristic of the optical disc according to the count number comprises:
    comparing the count number with a plurality of predetermined ranges respectively corresponding to a plurality of optical disc capacities; and
    when the count number falls within a specific range of the predetermined ranges, identifying the capacity of the optical disc as a specific optical disc capacity corresponding to the specific range.

4. A controller for identifying physical characteristic information of an optical disc, comprising:
    a control unit, configured for controlling a data accessing block of an optical disc drive to derive a reading result by reading at least a first region of the optical disc, wherein a location of the first region is specified in a Blu-ray disc (BD) specification for recording information associated with recording management of a BD recordable disc; and an identifying unit, configured for identifying a first physical characteristic of the optical disc according to the reading result;

wherein the location of the first region corresponds to a disc management area (DMA) specified in the BD specification; the first physical characteristic of the optical disc is a disc type of the optical disc; and when the reading result indicates that the first region is not blank, the identifying unit checks data recorded in the first region, identifies the optical disc as a BD-R disc when the data recorded in the first region include sequential recording range information (SRRI) or a space bit map (SBM), and identifies the optical disc as a BD-RE disc when the data recorded in the first region include none of the SRRI and the SBM.

5. A controller for identifying physical characteristic information of an optical disc, comprising:

a control unit, configured for controlling a data accessing block of an optical disc drive to derive a reading result by reading at least a first region of the optical disc, wherein a location of the first region is specified in a Blu-ray disc (BD) specification for recording information associated with recording management of a BD recordable disc;

an identifying unit, configured for identifying a first physical characteristic of the optical disc according to the reading result; and a counting unit, configured for counting data units in one full rotation of the optical disc to generate a count number;

wherein the identifying unit further identifies a second physical characteristic of the optical disc according to the count number.

6. The controller of claim 5, wherein the second physical characteristic of the optical disc is a capacity of the optical disc; and the identifying unit compares the count number with a plurality of predetermined ranges respectively corresponding to a plurality of optical disc capacities, and identifies the capacity of the optical disc as a specific optical disc capacity corresponding to a specific range when the count number falls within the specific range of the predetermined ranges.

* * * * *